United States Patent [19]
Wilkie, II et al.

[11] Patent Number: 6,072,159
[45] Date of Patent: Jun. 6, 2000

[54] DRAW-OUT HEATER SERVICE MODULE AND SWITCHGEAR INCORPORATING SAME

[75] Inventors: William Edward Wilkie, II, Fletcher; Steven Dale Walker, Arden, both of N.C.

[73] Assignee: Eaton Corporation, Cleveland, Ohio

[21] Appl. No.: 09/189,012

[22] Filed: Nov. 9, 1998

[51] Int. Cl.⁷ .............................. H02B 1/12; H05B 3/00
[52] U.S. Cl. ..................... 219/403; 219/523; 219/536; 361/605; 361/724; 312/236
[58] Field of Search ................... 219/403, 523, 219/536, 537, 520, 385; 361/608, 609, 605, 724–727; 312/236

[56] References Cited

U.S. PATENT DOCUMENTS

| | | | |
|---|---|---|---|
| 2,798,930 | 7/1957 | Frost | 219/403 |
| 3,279,350 | 10/1966 | Kaplan | 219/403 |
| 3,697,725 | 10/1972 | Bielefeldt | 219/403 |

FOREIGN PATENT DOCUMENTS

| | | |
|---|---|---|
| 2660 | 7/1979 | European Pat. Off. . |
| 543006 | 8/1922 | France . |
| 62-135209 | 6/1987 | Japan . |
| 393060 | 6/1933 | United Kingdom ............ 219/403 |
| 416016 | 9/1934 | United Kingdom ............ 219/403 |
| 454710 | 10/1936 | United Kingdom . |

*Primary Examiner*—John A. Jeffery
*Attorney, Agent, or Firm*—Martin J. Moran

[57] ABSTRACT

A heater for the middle, bus bar compartment of a switchgear cabinet is inserted from the rear compartment through an opening in a vertical panel at the rear of the middle compartment and is supported within the middle compartment by a bracket cantilevered from the panel. The bracket is U-shaped with a horizontal base and a pair of upstanding side walls forming rails on which the heater slides. The heater includes an inverted U-shaped guard over the heater element forming downwardly facing slots which engage the bracket rails. The guard and the bracket are perforated for convective circulation of air induced by the heater.

17 Claims, 4 Drawing Sheets

DRAW-OUT HEATER SERVICE MODULE AND SWITCHGEAR INCORPORATING SAME

BACKGROUND OF THE INVENTION

1. Field of the Invention

This invention relates to switchgear for electric power distribution systems. More particularly, it relates to an arrangement for mounting a heater within the switchgear cabinet.

2. Background Information

Switchgear assemblies for electric power distribution systems include electrical apparatus housed in metal cabinets with associated conductors such as bus bars and cabling for connecting the electrical apparatus in the distribution system. Typically, the electrical apparatus includes switching devices such as circuit breakers or network protectors which provide protection, and switches without protection such as disconnect switches for isolating parts of the distribution system, and transfer switches for connecting the distribution system to alternative power sources. The electrical apparatus can also include instrumentation such as metering equipment. Typically the cabinets are compartmentalized with the switching apparatus mounted in cells in a forward compartment, rigid bus bars located in a middle compartment and cabling terminated in a rear compartment.

Under certain operating conditions, typically low current and idle conditions, condensation can form in the cabinets. It is common to provide heaters which induce convective circulation of air through the compartments to control condensation. It is relatively easy to access and service the heaters in the forward and rear compartments. However, the heater in the middle, bus bar compartment, is much more difficult to service because of the presence of the rigid bus bar assemblies and the insulative barriers between them. Presently, cabling in the rear compartment, access panels and the barriers in the middle compartment must be rearranged or removed and the rigid bus bar configuration must be contended with to reach the middle compartment heater.

There is a need, therefore, for an arrangement for mounting the heaters, and particularly those in the middle compartments of switchgear assemblies, which can be more easily serviced.

SUMMARY OF THE INVENTION

This need and others are satisfied by the invention which is directed to a switchgear assembly which includes a cabinet with a front, a rear and middle compartment. The middle compartment has a vertical panel facing the rear compartment which has a heater opening for receiving a heater for the middle compartment. A mount for the heater includes a mounting bracket which is mounted on the vertical panel and extends into the middle compartment. The heater is insertable from the rear compartment through the heater opening and is supported within the middle compartment by the mounting bracket.

The mounting bracket has a pair of spaced apart rails extending into the middle compartment on which the heater is supported. Preferably, the mounting bracket is a U-shaped member having a base and two upstanding side walls which form the rails. The base has an integral downwardly extending flange along the front edge for cantilevering the bracket from the vertical panel adjacent the heater opening.

The heater includes a heater element and a guard in the form of an inverted U with a center section extending over the heater element and side walls extending downward from the center section along side of and spaced from the heater element to form slots. The slots between the heater element and the side walls of the guard engage and slide over the rails on the mounting bracket. The mounting bracket has stops which fix the depth to which the heater is inserted into the middle compartment. Preferably, the stops are formed by the front edges of the upstanding side walls on the mounting bracket and a front wall on the heater which bears against the front edges of the bracket side walls. The mount further includes a cover plate which is secured over the heater opening to retain the heater in place. Both the bracket and the guard element are perforated for convective air circulation.

The invention is also directed to the service module which includes the mounting bracket and the heater.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
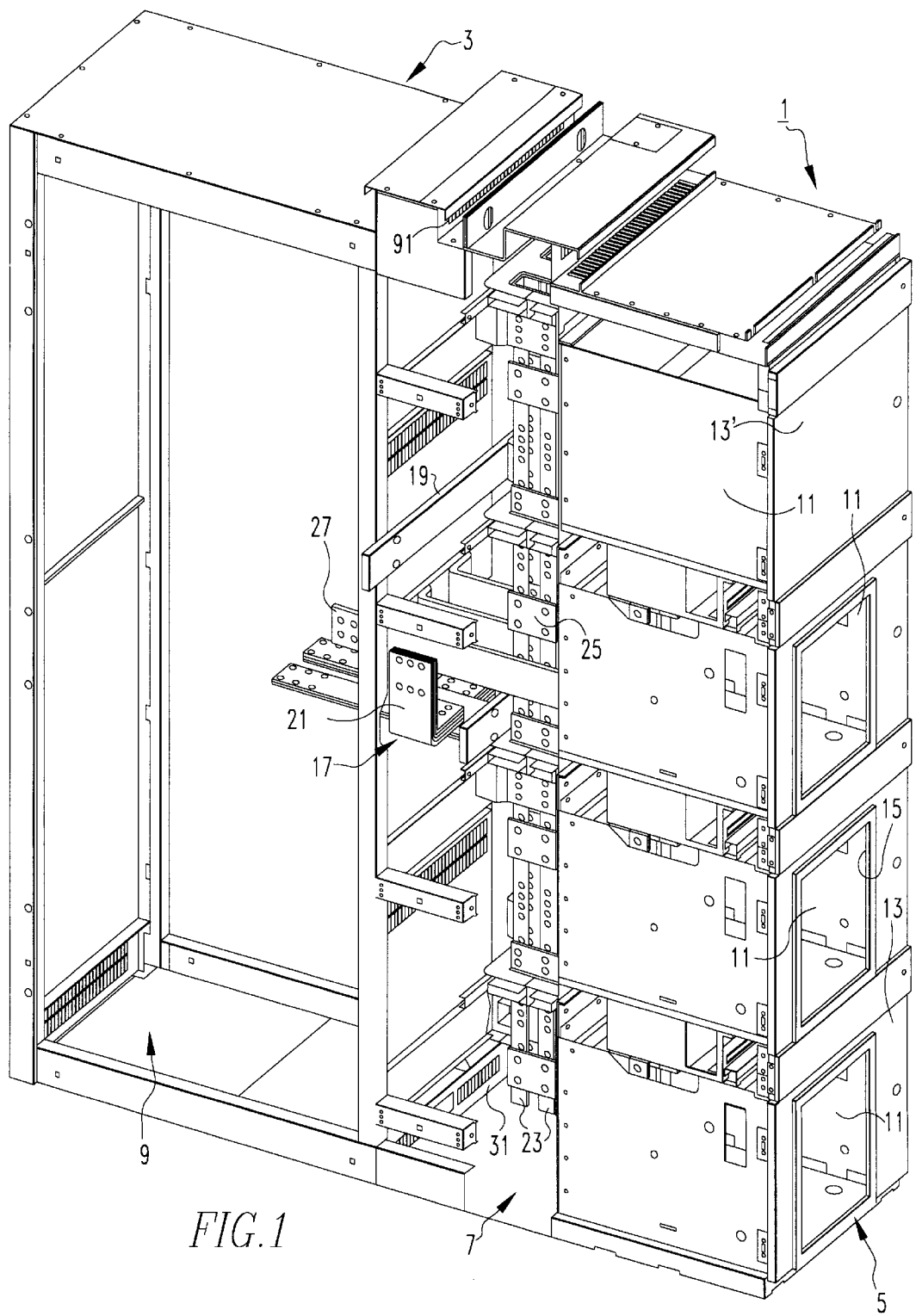
FIG. 1 is an isometric view of a switchgear assembly incorporating the invention with parts removed for clarity.

Referring to FIG. 1, the switchgear assembly 1 includes a metal cabinet 3 which has a forward compartment 5, a middle compartment 7 and a rear compartment 9. For purposes of illustration, some side panels of the cabinet 3 have been removed to make visible the interiors of the compartments.

The forward compartment 5 is divided into a number of vertically stacked cells 11 in which electrical apparatus (not shown) such as, for example, circuit breakers, are removably housed. Separate doors 13 are provided for access to each of the cells 11. In this switchgear assembly 1, the doors 13 of the lower 3 sections have openings 15 through which the front faces of the circuit breakers are accessible without opening the doors. In this particular arrangement, the top cell 11 houses metering equipment (not shown) and the door 13' is not provided with an opening 15.

The middle compartment 7 of the cabinet 3 houses a rigid horizontal bus 17 which includes three phase conductors 19 (only one shown for clarity) and a neutral conductor 21. The phase conductors 19 are connected to a set of vertically oriented risers 23. A set of stabs 25 extends forward from the risers 23 for engagement by quick disconnects (not shown) on the rear faces of the circuit breakers (not shown). Another set of quick disconnects on the circuit breakers connect with run backs 27 which extend through the middle compartment 7 into the rear compartment 9 where they are connected to cabling (not shown) leading out of the cabinet 3. Run backs have been shown in FIG. 1 only for one of the circuit breakers and, as mentioned, only one of the horizontal phase conductors 19 is shown. Thus, it can be appreciated that the middle compartment 7 is actually densely populated with the horizontal bus 17 running transversely through the compartment, the risers 23 running vertically through the compartment, and the stabs and run backs running horizontally forward and aft within the compartment. Likewise, the rear compartment 9 is heavily populated with cables (not shown) connected to run backs. There are separate three phase plus neutral sets of cables for each of the circuit breakers mounted in the cabinet. Furthermore, several pairs of cables are connected to each run back conductor. For example, in the case of a 3,200 amp service, ten pairs of cables can be provided for each phase of each circuit.

As mentioned, it is common to provide heaters in the three compartments of the cabinet 3 in order to prevent condensation. It should also be understood that the cabinet 3 is typically mounted side-by-side with other cabinets (not shown) so that once the switchgear 1 has been installed, the middle compartment 7 is only accessible either through the front compartment 5 or the rear compartment 9. However, due to the construction of the cells 11 and to the presences of barriers (not shown) between the front compartment 5 and middle compartment 7, it is practical to only access the middle compartment 7 from the rear compartment 9. Again, because of the concentration of cables in this rear compartment 9 and the presence of some additional barriers (not shown), it is also difficult to access the middle compartment 7 from the rear compartment 9.

Figure 2:
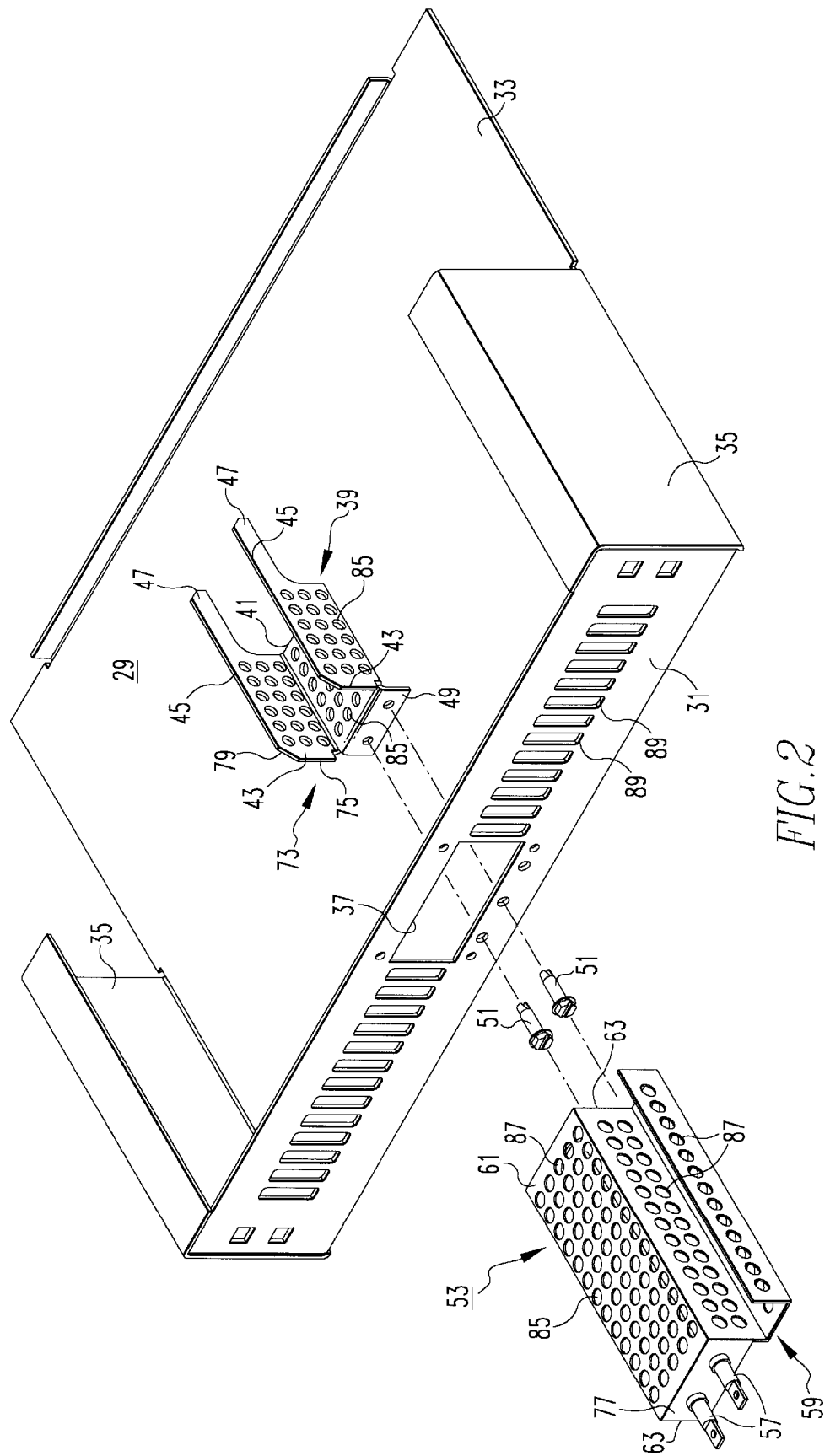
FIG. 2 is an exploded isometric view of a heater service module which forms part of the switchgear assembly of FIG. 1.
Figure 3:
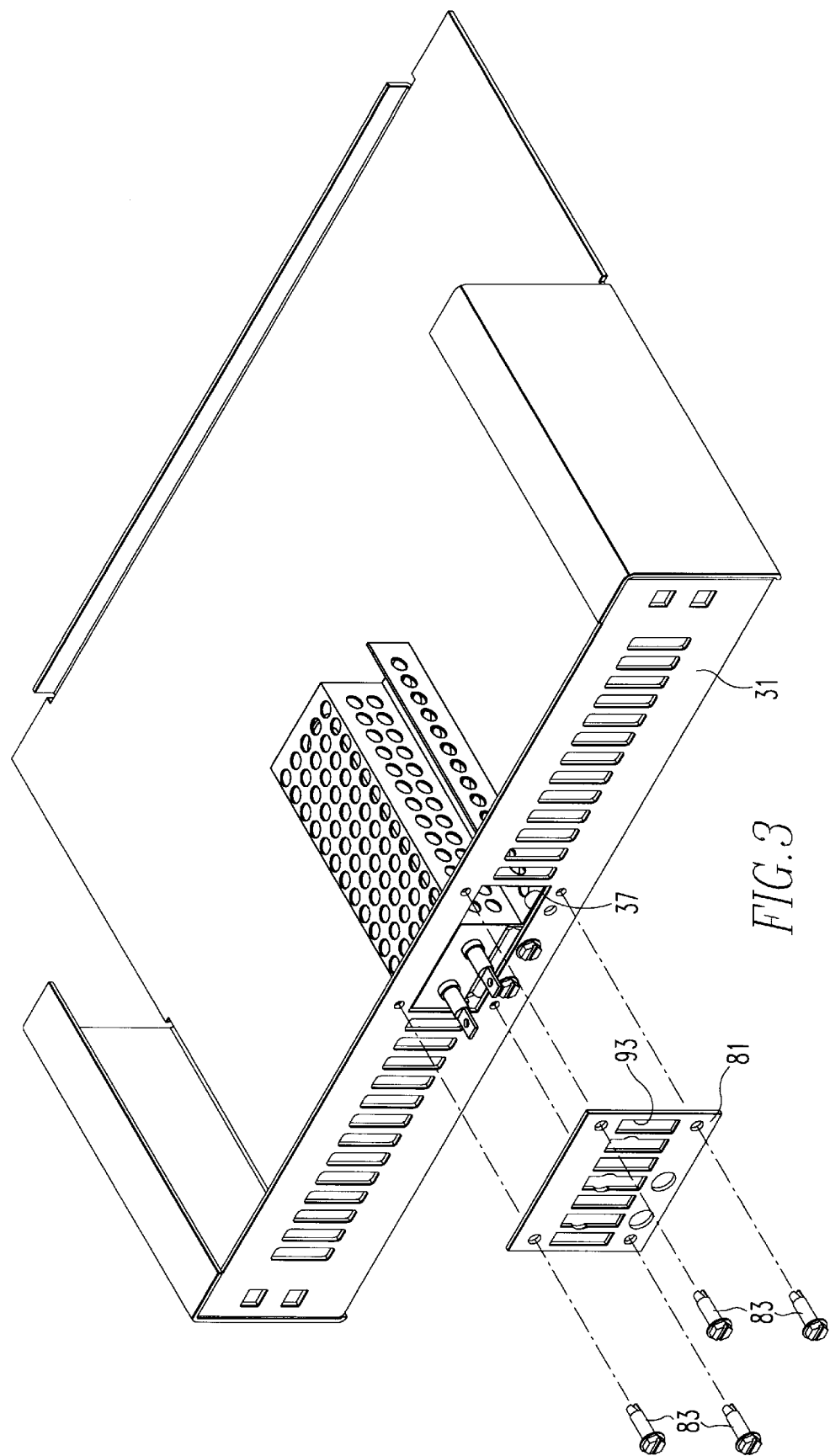
FIG. 3 is an exploded isometric view illustrating partial assembly of the service module of FIG. 2.

In accordance with the invention, a service module or mount 29 for a middle compartment heater is mounted in a vertical wall section 31 extending across the bottom of the cabinet 3 between the middle compartment 7 and the rear compartment 9. As can be seen from FIGS. 2 and 3, this mounting wall 31 is integrally formed of sheet material with a bottom wall 33 and partial side flanges 35. Centrally located in the mounting wall 31 is a mounting opening 37. The service module 29 includes a mounting bracket 39 comprising a generally U-shaped member having a horizontal base 41 and two upturned side walls 43 forming along their upper edges rails 45. The side walls 43 have extensions 47 which extend the length of the rails 45. Formed integrally with the base 41 is a downwardly turned mounting flange 49 which is secured to the mounting wall 31 by a pair of self tapping screws 51 just below the mounting opening 37 so that the mounting bracket is cantilevered into the middle compartment 7 adjacent the mounting opening.

Figure 4:
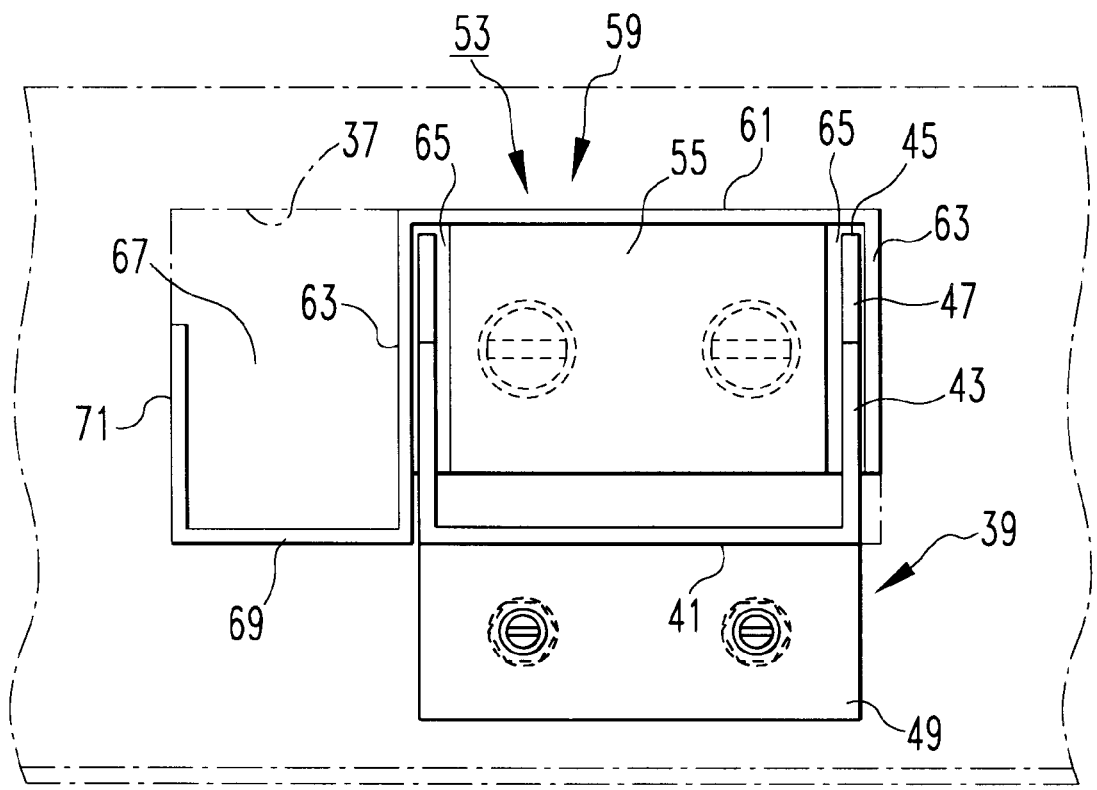
FIG. 4 is a rear elevation view of the assembled service module.

The heater 53 includes a heater element 55 having a pair of electrical leads 57 at one end. The heater 53 also includes a heater guard 59, which is best seen in FIG. 4 is configured as an inverted U with a base or center section 61 extending over the top of the heater element 55 and a pair of downwardly extending side walls 63. The side walls 63 are spaced laterally from the heater element 55 to form slots 65. The standard heater 53 utilized in the exemplary embodiment of the invention has an upturned trough 67 formed by flanges 69 and 71 extending along one side of the guard 59. This trough is not essential for the present invention but is accommodated for by the size of the mounting opening 37.

The mounting opening 37 in the mounting wall 31 is accessible from the rear compartment 9 with minimal disturbance of the cabling provided in that compartment. The heater 53 is inserted through the mounting opening with the slots 65 engaging the rails 45. Stops 73 for limiting the insertion of the heater 53 into the middle compartment 7 are provided by the leading edges 75 on the side walls 43 of the bracket 39 and an end wall 77 on the heater 53 which closes off the front end of the slots 65. These leading edges 75 of the bracket 39 are chamfered at 79 to provide a lead for insertion of the heater 53. The heater 53 is retained in place on the bracket 39 against the stops 73 by a cover plate 81 which is secured to the mounting wall 31 over the mounting opening 37 by self-tapping screws 83.

The base 41 and side walls 43 of the bracket 39 are perforated by closely spaced apertures 85. Similarly, the base 61, side walls 63 and flanges 69 and 71 of the heater guard 59 are also perforated by a number of apertures 87. These apertures 85 and 87 permit convection flow of air around the heater element 55. In addition, the mounting wall 31 is provided with a number of slots 89 through which cooling air can be drawn into the middle compartment 7 by the convection flow generated by the heater element 55. As will be noticed from FIG. 1, vents 91 at the top of the middle compartment permit the rising heated air to escape from the compartment. The cover plate 81 also has slots 93 allowing air flow into the middle compartment from the rear compartment.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A switchgear assembly comprising:
   a cabinet having a front compartment, a rear compartment and a middle compartment between said front compartment and rear compartment, said middle compartment having a vertical panel facing said rear compartment with a heater opening therein;
   a mount including a mounting bracket and fastener means securing said mounting bracket to said vertical panel with said mounting bracket extending into said middle compartment; and
   a heater insertable from said rear compartment through said heater opening and supported within said middle compartment by said mounting bracket.

2. The switchgear assembly of claim 1 wherein said mounting bracket has a pair of spaced apart rails extending into said middle compartment on which said heater is supported.

3. The switchgear assembly of claim 2 wherein said mounting bracket comprises a U-shaped member having a base and two upstanding side walls forming said spaced rails.

4. The switchgear assembly of claim 3 wherein said base and upstanding side walls are perforated by apertures.

5. The switchgear assembly of claim 3 wherein said base of said bracket has an integral downwardly turned flange along a front edge and said fastener means secures said flange to said vertical panel below said heater opening with said base and side walls cantilevered into said middle compartment.

6. The switchgear assembly of claim 3 wherein said heater comprises a heater element and a guard in the form of an inverted U with a center section extending over said heater element and side walls extending downward from said center section alongside of and spaced from said heater element forming slots which engage said rails.

7. The switchgear assembly of claim 6 wherein said base and upstanding side walls of said bracket and said center section and side walls of said guard are perforated by apertures.

8. The switchgear assembly of claim 6 wherein said bracket includes stops fixing a depth that said heater can be inserted into said middle compartment.

9. The switchgear assembly of claim 8 wherein said stops comprise front edges of said upstanding side walls on said bracket, and said guard has a front wall blocking said slots and which seats against said front edges of said upstanding side walls of said bracket.

10. The switchgear assembly of claim 9 wherein said mount includes a cover plate secured over said heater opening and retaining said heater against said stops.

11. The switchgear assembly of claim 2 wherein said heater comprises a heater element and a guard in the form of an inverted U with a center section extending over said heater element and side walls extending downward from said center section alongside of and spaced from said heater element forming slots which engage said rails.

12. A service module for a heater for switchgear including a metal cabinet having a mounting wall within the cabinet with a mounting opening leading to a compartment, said service module comprising:

a mounting bracket secured to said mounting wall adjacent said mounting opening and having a pair of spaced rails extending substantially horizontally into said compartment on which said heater is supported within said cabinet;

a cover plate covering said mounting opening; and wherein said bracket comprises a U-shaped member having a base and a pair of spaced upstanding side walls forming said spaced rails.

13. The service module of claim 12 wherein said base of said U-shaped member has a downwardly turned flange along a front edge for attaching said bracket to said mounting wall below said mounting opening.

14. The service module of claim 12 wherein said base and upstanding side walls of said U-shaped member are perforated.

15. The service module of claim 12 wherein front edges of said upturned side walls of said U-shaped member form stops.

16. The service module of claim 15 wherein said base and upstanding side walls of said U-shaped member are perforated.

17. The service module of claim 16 wherein said base of said U-shaped member has an integral mounting flange extending from a front edge and which is secured to said mounting wall adjacent said mounting opening.

* * * * *